US010133731B2

(12) United States Patent
Zelenkov (10) Patent No.: US 10,133,731 B2
(45) Date of Patent: Nov. 20, 2018

(54) METHOD OF AND SYSTEM FOR PROCESSING A TEXT

(71) Applicant: YANDEX EUROPE AG, Lucerne (CH)

(72) Inventor: Yury Grigorievich Zelenkov, Orekhovo-Zuevo (RU)

(73) Assignee: Yandex Europe AG, Lucerne (CH)

( * ) Notice: Subject to any disclaimer, the term of this patent is extended or adjusted under 35 U.S.C. 154(b) by 184 days.

(21) Appl. No.: 15/427,319

(22) Filed: Feb. 8, 2017

(65) Prior Publication Data

US 2017/0228369 A1 Aug. 10, 2017

(30) Foreign Application Priority Data

Feb. 9, 2016 (RU) .................................. 2016104133

(51) Int. Cl.
*G06F 17/27* (2006.01)
*G06F 17/21* (2006.01)
*G06F 17/30* (2006.01)

(52) U.S. Cl.
CPC ...... *G06F 17/2785* (2013.01); *G06F 17/2705* (2013.01); *G06F 17/2795* (2013.01); *G06F 17/30719* (2013.01)

(58) Field of Classification Search
None
See application file for complete search history.

(56) References Cited

U.S. PATENT DOCUMENTS

| 6,076,088 | A | 6/2000 | Paik et al. |
|---|---|---|---|
| 7,051,024 | B2 | 5/2006 | Fein et al. |
| 7,251,781 | B2 | 7/2007 | Batchilo et al. |
| 7,899,666 | B2 * | 3/2011 | Varone ............... G06F 17/2795 704/10 |
| 8,892,523 | B2 | 11/2014 | Amarendran |
| 9,020,808 | B2 | 4/2015 | Branton |
| 9,047,283 | B1 | 6/2015 | Zhang et al. |
| 2002/0078090 | A1 | 6/2002 | Hwang et al. |
| 2002/0078091 | A1 | 6/2002 | Vu et al. |

(Continued)

OTHER PUBLICATIONS

Arun et al., Document Summarization and Classification using Concept and Context Similarity Analysis, International Journal of Innovative Research in Science, Engineering and Technology, vol. 3, Special Issue 1, Feb. 2014, pp. 1256-1260.

(Continued)

*Primary Examiner* — Satwant Singh
(74) *Attorney, Agent, or Firm* — BCF LLP (57) ABSTRACT

There is disclosed a computer-implemented method for generating a summary of a digital text. The method can be executable on a server. The server being coupled to a communication network. Embodiments of the methods disclosed herein generate a summary of the digital text by selecting sentences from the digital text based on a calculated sentence value. The sentence value is calculated by relying on the digital text itself without use of ontology dictionaries. Embodiments of the present method determine the sentence value by firstly breaking the sentence into one or more concept phrases and then determining, for a given sentence of the digital text: (i) a non-contextual value for its concept phrases and (ii) a contextual value for its concept phrases.

20 Claims, 4 Drawing Sheets

(56) References Cited

U.S. PATENT DOCUMENTS

| | | | |
|---|---|---|---|
| 2010/0287162 A1* | 11/2010 | Shirwadkar | G06F 17/2785 707/740 |
| 2014/0025687 A1 | 1/2014 | Aleksovski et al. | |
| 2014/0195897 A1 | 7/2014 | Balinsky et al. | |
| 2014/0280043 A1 | 9/2014 | Griffin et al. | |
| 2015/0293905 A1* | 10/2015 | Wang | G06F 17/2785 704/9 |
| 2018/0081870 A1* | 3/2018 | Zelenkov | G06F 17/2827 |

OTHER PUBLICATIONS

Prabha et al., Context-Based Similarity Analysis for Document Summarization, International Journal of Advanced Research in Computer Engineering & Technology (IJARCET), vol. 3, Issue 4, Apr. 2014, ISSN: 2278-1323 pp. 1485-1491.

\* cited by examiner

METHOD OF AND SYSTEM FOR PROCESSING A TEXT

CROSS-REFERENCE

The present application claims priority to Russian Patent Application No. 2016104133, filed Feb. 9, 2016, entitled "METHOD OF AND SYSTEM FCIR PROCESSING A TEXT", the entirety of which is incorporated herein by reference.

FIELD

The present technology relates to systems and methods for processing a text. In particular, the systems and methods relate to processing a text for generating a summary thereof.

BACKGROUND

Developments in computer technology have allowed processing of large volume of data, including computer-processing of texts. Computer-based generation of summaries or abstracts of a document is one of the challenging tasks of computer linguistics. The main challenge in computer-based generation of a summary of a document is two fold: (i) processing speed (as some of the summaries need to be generated "on the fly") and (ii) accuracy (i.e. providing the summary without losing the overall meaning of the document).

Such computer-generated summaries are used in several areas of computer technologies, such as search engines (for generating snippets for inclusion into a Search Engine Results Page or, simply, SERP), for providing user summaries of various documents to enable a more efficient computer search, generating newsfeeds from news articles, maintaining databases of textual information, computer-based translation of texts and the like.

Generally speaking, there exist two types of computer-based approaches to generating a summary of a given document. The first type is a generative method of summarization and involves selecting words or phrases (not whole sentences) of a particular document. The method then generates a summary based upon the selected words or phrases.

The second type—an extractive summarization—is a process of selecting and extracting "text spans" (typically, sentences) from the document. The extracted text spans are then re-arranged in some order to form a summary.

US2015/0293905 discloses a method for summarizing a document. A concept is detected for each sentence in the document. Relevance measures between the sentences are computed according to the detected concepts. And then a concept-aware graph is constructed, wherein a node in the graph represents a sentence in the document and an edge between two nodes represents a relevance measure between these two sentences.

U.S. Pat. No. 7,899,666 discloses a method and system for automatically extracting relations between concepts included in electronic text. Aspects of the exemplary embodiment include a semantic network comprising a plurality of lemmas that are grouped into synsets representing concepts, each of the synsets having a corresponding sense, and a plurality of links connected between the synsets that represent semantic relations between the synsets. The semantic network further includes semantic information comprising at least one of: 1) an expanded set of semantic relation links representing: hierarchical semantic relations, synset/corpus semantic relations verb/subject semantic relations, verb/direct object semantic relations, and fine grain/coarse grain sematic relationship; 2) a hierarchical category tree having a plurality of categories, wherein each of the categories contains a group of one or more synsets and a set of attributes, wherein the set of attributes of each of the categories are associated with each of the synsets in the respective category; and 3) a plurality of domains, wherein one or more of the domains is associated with at least a portion of the synsets, wherein each domain adds information regarding linguistic context in which the corresponding synset is used in a language. A linguistic engine uses the semantic network to performing semantic disambiguation on the electronic text using one or more of the expanded set of semantic relation links, the hierarchical category tree, and the plurality of domains to assign a respective one of the senses to elements in the electronic text independently from contextual reference.

"Context-Based Similarity Analysis for Document Summarization" by Prabha et al., relates to document summarization. Document classification methods are used to assign the category of the documents Bernoulli model of randomness is used for document summarization process. The Bernoulli model of randomness is used to find the probability of the co-occurrences of two terms in a large corpus. The lexical association between term is used to produce a context sensitive weight to the document terms. The document indexing and summarization scheme is enhanced with linguistic analysis mechanism. Context sensitive index model is improved with semantic weight values. Concept relationship based lexical association measure estimation is performed for index process. Bernoulli lexical association measure is used to perform the document classification process. The Java language and Oracle relational database are used for the system development process. The proposed model gives a higher weight to the content-carrying terms and as a result, the sentences are presented in such a way that the most informative sentences appear on the top of the summary, making a positive impact on the quality of the summary.

SUMMARY

The present technology may ameliorate at least some deficiencies of the prior art with respect to search queries processing.

Embodiments of the present technology have been developed based on developers realization of at least one technical problem associated with the prior art approaches to generating a summary of a document. During the extractive summarization, the quality of the summary is dependent on the manner used to select the text spans from the document. Developers have further realized that text spans in the document do not have equal value for the purpose of understanding the main idea or ideas of the document. Accordingly, if some sentences are more valuable and meaningful than others, it would be beneficial to generate the summary of the document using sentences with having higher "value".

Developers have further appreciated that the prior art approaches rely on ontology dictionaries to identify and/or select text spans for inclusion into summaries. The problem with such ontology-dictionary-based approach is that such dictionaries need to be generated, maintained and stored in a memory before computer-based summarization of texts can be executed. Furthermore, the prior art approaches are mostly effective for summarizing the texts having a theme for which the dictionary has been generated and properly maintained.

Embodiments of the present technology address at least some of the technical problems of the prior art by implementing a computer-executed method of generating a summary of a text by selecting sentences from a digital text based on a calculated sentence value. The sentence value is calculated by relying on the digital text itself without use of ontology dictionaries. More specifically, embodiments of the present technology determine the sentence value by firstly breaking the sentence into one or more concept phrases and then determining, for a given sentence of the digital text: (i) a non-contextual value for its concept phrases and (ii) a contextual value for its concept phrases.

In accordance with a first broad aspect of the present technology, there is provided a computer-implemented method for generating a summary of a digital text. The method can be executable on a server, the server being coupled to a communication network. The method comprises: acquiring by the server, an indication of the digital text to be processed, the digital text comprising a plurality of sentences; parsing by the server, each of plurality of sentences into one or more concept phrases, each of the one or more concept phrases having at least one word; the parsing being executed by applying at least one parsing parameter; executing, by the server, a first analysis to generate a context-independent relation (CIR) value for a given concept phrase of the one or more concept phrases, the CIR value representing a first ratio of a co-inclusion of: (i) at least one word of the given concept phrase and (ii) at least one word of each of the remaining concept phrases of the one or more concept phrases; executing, by the server, a second analysis to generate a context-dependent relation (CDR) value for the given concept phrase, the CDR value representing a second ratio of: (i) a number of sentences where the given concept phrase co-occurs with another concept phrase of the one or more concept phrases to (ii) a total number of the plurality of sentences containing the other concept phrase within the digital text; determining by the server, a total CIR weight and a total CDR weight for each of the concept phrases; determining by the server, for each of the concept phrase, a concept meaning value, based at least in part on its respective total CIR weight and the total CDR weight; determining by the server, for a given sentence of the plurality of sentences, a sentence meaning value, based at least in part of the concept meaning value of each concept phrase contained in the given sentence; ranking by the server, each sentence based at least on the determined sentence meaning value; and generating by the server, the summary of the digital text, the summary of the digital text comprising at least one sentence extracted from the digital text based on its determined ranking.

In some embodiments of the method, the method further comprises storing, in a memory, the summary of the digital text in association with the digital text.

In some embodiments of the method, the at least one parsing parameter is based on at least one heuristic.

In some embodiments of the method, the method further comprises prior to the acquiring the indication of the digital text to be processed, acquiring by the server at least one heuristic and storing by the server the at least one heuristic.

In some embodiments of the method, the concept phrase comprises a meaningful logical entity that is formed of the at least one word.

In some embodiments of the method, the at least one parsing parameter identifies the meaningful logical entity based on the at least one word being a noun.

In some embodiments of the method, the at least one parsing parameter identifies the meaningful logical entity based on the at least one word being a noun-based grammatical entity.

In some embodiments of the method, the method further comprises, prior to the determining the CIR value and the determining the CDR value, normalizing each of the at least one word.

In some embodiments of the method, the method further comprises, prior to the determining the CIR value and the determining the CDR value, determining common synonyms between a given word of a first concept phrase and another given word of a second concept phrase.

In some embodiments of the method, the first analysis comprises a non-ontology based analysis.

In some embodiments of the method, the method further comprises analyzing the CIR value to determine a relationship of the associated given concept phrase and another given one of the remaining concept phrases of the one or more concept phrases to be one of: genus-species relationship, equivalent relationship and associative relationship.

In some embodiments of the method, the step of determining the total CIR weight for the given concept phrase comprises aggregating a plurality of CIR values of the given concept phrase, a given one of the plurality of CIR values being in respect to another given one of at least some of the remaining concept phrases within the digital text.

In some embodiments of the method, at least some of the remaining concept phrases within the digital text comprise those remaining concept phrases that have been determined, by the first analysis, to be semantically linked to the given concept phrase.

In some embodiments of the method, at least some of the remaining concept phrases within the digital text comprise an entirety of the remaining concept phrases.

In some embodiments of the method, the step of determining the total CDR weight for the given concept phrase comprises aggregating a plurality of CDR value of the given concept phrase, a given one of the plurality of CDR values being in respect to another given one of the remaining co-occurring concept phrases within the digital text.

In some embodiments of the method, the determining the concept meaning value for the given concept phrase comprises aggregating the value of the total CIR weight and the value of the total CDR weight of the given concept phrase.

In some embodiments of the method, the step of aggregating the value of the total CIR weight and the value of the total CDR weight of the given concept phrase comprises multiplying the total CIR weight and the value of the total CDR weight.

In some embodiments of the method, the determining the sentence meaning value for the given sentence comprises aggregating a respective concept meaning value of each concept phrase contained in the given sentence.

In some embodiments of the method, the aggregating the respective concept meaning value of each concept phrase contained in the given sentence comprises (i) adding the respective concept meaning value of each concept phrase contained in the given sentence to generate a total value and (ii) sub-dividing the total value by the number of concept phases within the given sentence.

In some embodiments of the method, the generating the summary of the digital text comprises selecting a pre-selected number of sentences from the plurality of sentences based on their respective sentence meaning value.

In some embodiments of the method, the selecting further comprising preserving an order the pre-selected number of sentences follow in the digital text.

In some embodiments of the method, the method further comprises, prior to the acquiring the indication of the digital text to be processed, acquiring an indication of the pre-selected number of sentences.

In some embodiments of the method, the selecting the pre-selected number of sentences from the plurality of sentences based on their respective sentence meaning value comprises: (i) selecting a first subset of the pre-selected number of sentences from a first portion of the digital text and (ii) selecting a second subset of the pre-selected number of sentences from a second portion of the digital text.

In some embodiments of the method, the executing the first analysis to generate the context-independent relation (CIR) value for the given concept phrase relative to a target phrase which is another one of the one or more concept phrases comprises: (i) determining a number of words of the given concept phrase that are also present in the target phrase and (ii) dividing the number of co-occurring words by a total number of words in the target phrase.

In accordance with another broad aspect of the present technology there is provided a computer-implemented method for generating a summary of a digital text. The method can be executable on a server, the server being coupled to a communication network. The method comprise: acquiring by the server, an indication of the digital text to be processed, the digital text comprising a plurality of sentences; parsing by the server, each of plurality of sentences into one or more concept phrases, each of the one or more concept phrases having at least one word; the parsing being executed by applying at least one parsing parameter; executing, by the server, a first analysis to generate a context-independent relation (CIR) value for a given concept phrase of the one or more concept phrases, the CIR value representing a first ratio of a co-inclusion of: (i) at least one word of the given concept phrase and (ii) at least one word of each of the remaining concept phrases of the one or more concept phrases; executing, by the server, a second analysis to generate a context-dependent relation (CDR) value for the given concept phrase, the CDR value representing a second ratio of: (i) a number of sentences where the given concept phrase co-occurs with another concept phrase of the one or more concept phrases to (ii) a total number of the plurality of sentences containing the other concept phrase within the digital text; determining by the server, a total CIR weight and a total CDR weight for each of the concept phrases; determining by the server, for each of the concept phrase, a concept meaning value, based at least in part on its respective total CIR weight and the total CDR weight; determining by the server, for a given sentence of the plurality of sentences, a sentence meaning value, based at least in part of the concept meaning value of each concept phrase contained in the given sentence; ranking by the server, each sentence based at least on the determined sentence meaning value; and assigning, by the server, a topic category to the digital text, the topic category being based on at least one higher ranked concept phrase.

In accordance with another broad aspect of the present technology, there is provided a server. The server comprises: a communication interface for communication with an electronic device via a communication network, a processor operationally connected with the communication interface, the processor configured to: acquire an indication of a digital text to be processed in order to generate a summary thereof, the digital text comprising a plurality of sentences; parse each of plurality of sentences into one or more concept phrases, each of the one or more concept phrases having at least one word by applying at least one parsing parameter; execute a first analysis to generate a context-independent relation (CIR) value for a given concept phrase of the one or more concept phrases, the CIR value representing a first ratio of a co-inclusion of: (i) at least one word of the given concept phrase and (ii) at least one word of each of the remaining concept phrases of the one or more concept phrases; execute a second analysis to generate a context-dependent relation (CDR) value for the given concept phrase, the CDR value representing a second ratio of: (i) a number of sentences where the given concept phrase co-occurs with another concept phrase of the one or more concept phrases to (ii) a total number of the plurality of sentences containing the other concept phrase within the digital text; determine a total CIR weight and a total CDR weight for each of the concept phrases; determine, for each of the concept phrase, a concept meaning value, based at least in part on its respective total CIR weight and the total CDR weight; determine, for a given sentence of the plurality of sentences, a sentence meaning value, based at least in part of the concept meaning value of each concept phrase contained in the given sentence; rank each sentence based at least on the determined sentence meaning value; and generate the summary of the digital text, the summary of the digital text comprising at least one sentence extracted from the digital text based on its determined ranking.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

Figure 1:
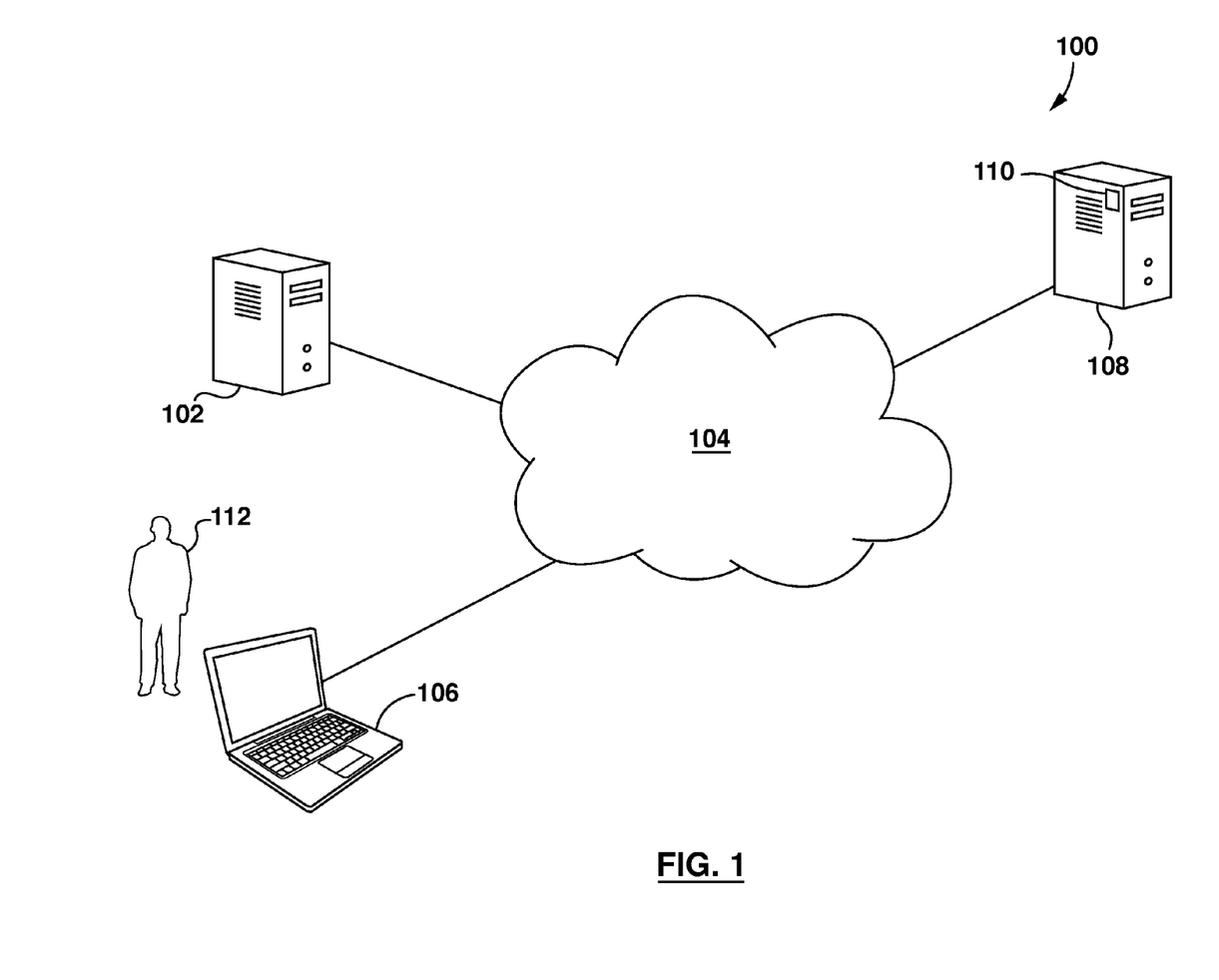
FIG. 1 is a diagram of a system suitable for implementing embodiments of the present technology and/or being used in conjunction with implementations of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth herein below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of a greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

The system 100 comprises a processing server 102 (or, simply, "server 102"). The processing server 102 can be implemented as a conventional computer server. In an example of an embodiment of the present technology, the processing server 102 can be implemented as a Dell™ PowerEdge™ Server running the Microsoft™ Windows Server™ operating system. Needless to say, the processing server 102 can be implemented in any other suitable hardware and/or software and/or firmware or a combination thereof. In the depicted non-limiting embodiment of present technology, the processing server 102 is a single server. In alternative non-limiting embodiments of the present technology, the functionality of the processing server 102 may be distributed and may be implemented via multiple servers.

The processing server 102 can be a dedicated server configured and programmed for executing various routines to be described herein below. In alternative embodiments, the processing server 102 can execute various routines to be described below in addition to other routines that the processing server 102 can execute. For example, the processing server 102 can be implemented as a search engine server and can be configured to execute various routines to be described herein below in addition to executing various routines associated with executing searches and rendering Search Engine Result Pages (SERPs).

The hardware implementation of the processing server 102 is well known to the person skilled in the art of the present technology. However, briefly speaking, the processing server 102 comprises a communication interface (not depicted) structured and configured to communicate with various entities via the communication network 104. To that end, the processing server 102 is coupled to the communication network 104. In some non-limiting embodiments of the present technology, the communication network 104 can be implemented as the Internet. In other embodiments of the present technology, the communication network 104 can be implemented differently, such as any wide-area communications network, local-area communications network, a private communications network and the like.

Also coupled to the communication network 104 is a document-source-server 108. Akin to the processing server 102 the document-source-server 108 can be implemented as a conventional computer server. In an example of an embodiment of the present technology, the document-source-server 108 can also be implemented as a Dell™ PowerEdge™ Server running the Microsoft™ Windows Server™ operating system.

Needless to say, the document-source-server 108 can be implemented in any other suitable hardware and/or software and/or firmware or a combination thereof. In the depicted non-limiting embodiment of present technology, the document-source-server 108 is a single server. In alternative non-limiting embodiments of the present technology, the functionality of the document-source-server 108 may be distributed and may be implemented via multiple servers. It should be expressly understood that the document-source-server 108 and the processing server 102 do not have to be implemented in the same manner.

The document-source-server 108 hosts content, including one or more digital documents 110. The nature of the one or more digital documents 110 is not particularly limited. Broadly speaking, a given one of the one or more digital documents 110 (referred to as a digital document 110, for simplicity) contains one or more sentences. The digital document 110, can be, for example, a web page containing text and/or images (such as, for example, a WIKIPEDIA™ article about mainframe computers). The digital document 110, can be as another example, a digital version of a book (such as, for example, a digital version of "Pride and Prejudice" by Jane Austin).

Irrespective of the type of the digital document 110 it may be desirable to generate a summary of the digital document 110. The applications of such summarization are numerous. Just as a few examples, it may be desirable to generate a summary of the digital document 110 being a web resource for including such generated summary into a Search Engine Results Page (SERP) that is generated by a search engine server in response to a user query. As another example, it may be desirable to generate a summary of the digital document 110 being the digital version of a book to publish such a summary in response to receiving a request for such the summary (for example, a user request submitted to a dedicated server).

Irrespective as to why such summarization may be desirable, within the system 100, there is provided a client device 106. The client device 106 is capable of accessing the document-source-server 108 and/or the processing server 102 via the communication network 104. The client device 106 is capable of accessing the document-source-server 108 and/or the processing server 102 to either access the content of the one or more digital documents 110 or to access a generated summary thereof. To that end, the client device 106 is coupled to the communication network 104 via a communication link (not separately numbered).

The hardware implementation of the client device 106 is not particularly limited. The client device 106 may be, for example and without being limitative, a desktop computer (as is the case within the illustration of FIG. 1), a laptop computer, a smart phone (e.g. an Apple iPhone™ or a Samsung Galaxy S5™), a personal digital assistant (PDA) or any other device including computing functionality and data communication capabilities. The client device 106 may comprise inter alia internal hardware components including one or more single or multi-core processors collectively referred to herein as processor (not depicted), a random access memory (not depicted), and a network interface (not depicted) for communicating with the document-source-server 108.

How the communication link is implemented is not particularly limited and will depend on how the client device 106 is implemented. Merely as an example and not as a limitation, in those embodiments of the present technology where the client device 106 is implemented as a wireless communication device (such as a smart-phone), the communication link can be implemented as a wireless communication link (such as but not limited to, a 3G communications network link, a 4G communications network link, a Wireless Fidelity, or WiFi®, Bluetooth® and the like). In those examples, where the client device 106 is implemented as a notebook computer, the communication link can be either wireless (such as the Wireless Fidelity, or WiFi®, Bluetooth® and the like) or wired (such as an Ethernet based connection).

The client device 106 is associated with a user 112 which may interact with the client device 106. In some embodiments, the client device 106 may be configured to execute a browser application (not depicted). Generally speaking, the purpose of the browser application is to enable the user 112 to access one or more web resources and/or one or more services. The one or more web resources and/or one or more services can be stored or provided by the processing server 102 and/or the document-source-server 108.

How the browser application is implemented is not particularly limited. One example of the browser application may be embodied as a Yandex™ browser. Although the client device 106 is associated with the user 112, such an association does not require a need for the user 112 to login or the like.

It should be expressly understood that implementations of the client device 106, the communication link and the communication network 104 are provided for illustration purposes only. As such, those skilled in the art will easily appreciate other specific implementational details for the client device 106, the communication link and the communication network 104. As such, by no means, examples provided herein above are meant to limit the scope of the present technology.

Figure 3:
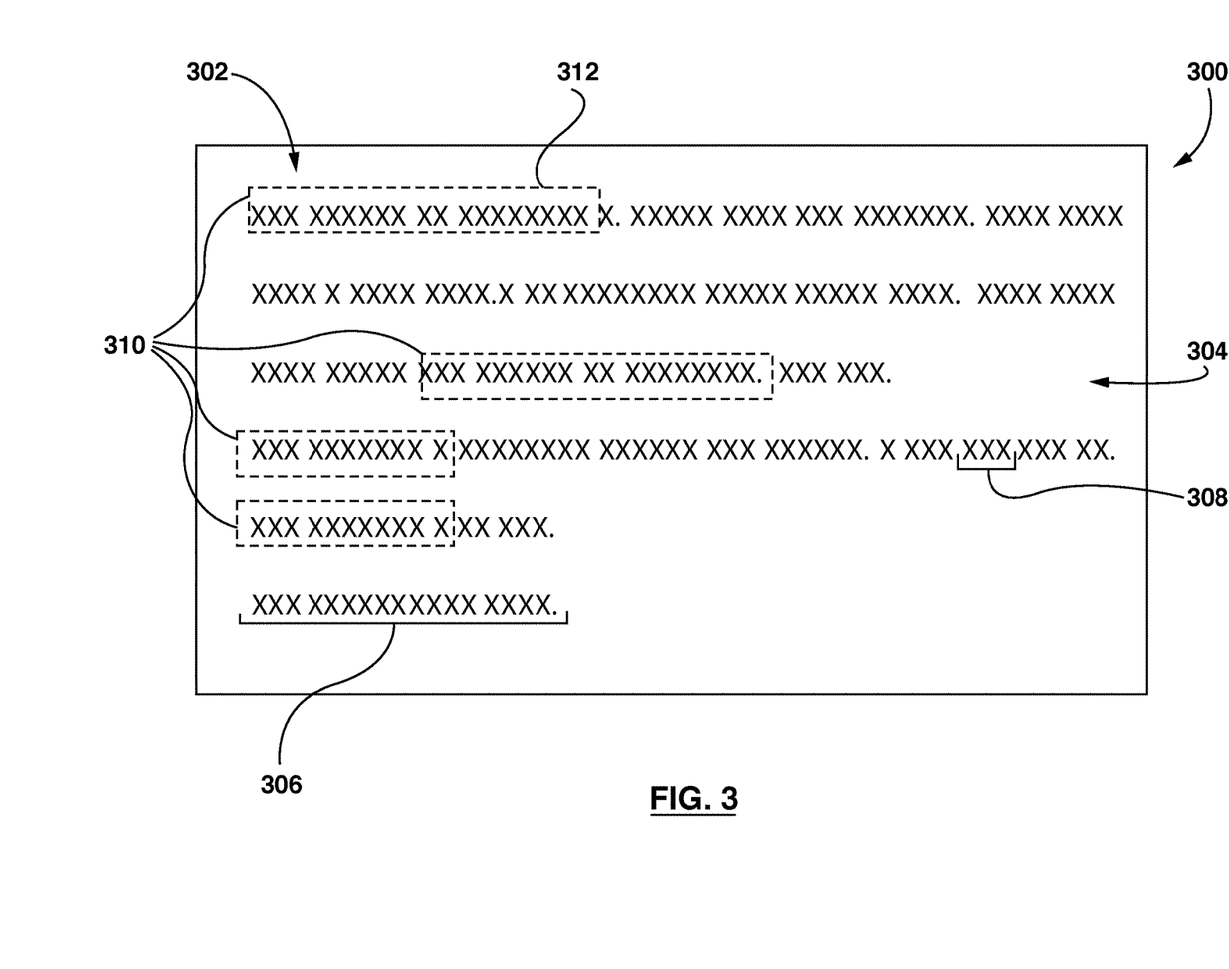
FIG. 3 depicts a screen shot showing a digital text, the digital text being displayed on a client device of the system of FIG. 1.

FIG. 3 depicts a screen shot 300, the screen shot 300 depicting a digital text 302. The digital text 302 can be, for example, a rendered version of the one or more digital documents 110 accessed by the client device 106 via the communication network 104. For illustration purposes only, it shall be assumed that the one or more digital documents 110 is a digital version of the book and the digital text 302 is a portion of the digital version of the book rendered on an output device of the client device 106. Although the output device is not depicted, it can be implemented as a screen, a monitor, a touch-screen or the like.

The digital text 302 is made up of a plurality of sentences 304, the plurality of sentences comprising a number of individual sentences 306. Each sentence 306 is separated by a punctuation mark, which is a period in the illustrated embodiment, but can also be an exclamation mark, a question mark, etc. Each sentence 306 is made up of individual word 308. As such, the sentence 306 can comprise one or more individual words 308. For the avoidance of doubt, it should be mentioned here that the digital text 302 (and more specifically, each letter of the individual words 308) is represented by an "X", however, in reality the individual words 308 are made of letters in a given language. For example, when the given language is English, a given sentence 306 can be: "The cost of modern computer systems has been steadily decreasing compared to early days of computers".

Figure 2:
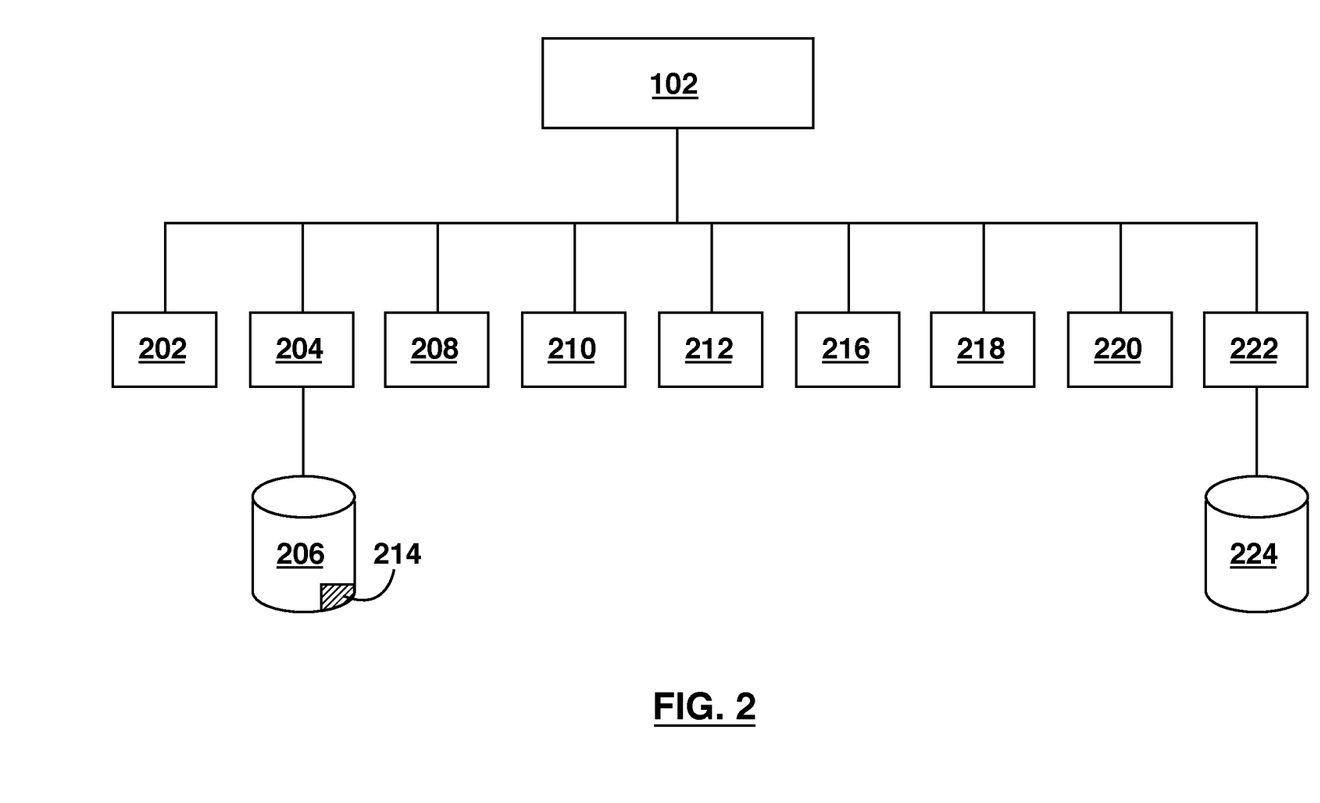
FIG. 2 is a schematic illustration of a processing server of the system of FIG. 1, the processing server being implemented in accordance to some of the non-limiting embodiments of the present technology

Using an example of the digital text 302, functions and operation of the various components of processing server 102 will now be described in greater details. With reference to FIG. 2, there is depicted a schematic illustration of the processing server 102 being implemented in accordance to some of the non-limiting embodiments of the present technology. The processing server 102 comprises (or otherwise has access to): a text acquiring module 202, a parsing module 204, a parsing parameter database 206, a context-independent relation value generating module 208, a context-dependent relation value module 210, a value weight processing module 212, a concept meaning value determining module 216, a sentence meaning value determining module 218, a ranking module 220, a summary generating module 222, a summary storage 224.

Although the text acquiring module 202, the parsing module 204, the parsing parameter database 206, the context-independent relation value generating module 208, the context-dependent relation value module 210, the value weight processing module 212, the concept meaning value determining module 216, the sentence meaning value determining module 218, the ranking module 220, the summary generating module 222 and the summary storage 224 are illustrated schematically herein in a distributed manner for ease of explanation, it is contemplated that some or all of the text acquiring module 202, the parsing module 204, the parsing parameter database 206, the context-independent relation value generating module 208, the context-dependent relation value module 210, the value weight processing module 212, the concept meaning value determining module 216, the sentence meaning value determining module 218, the ranking module 220, the summary generating module 222 and the summary storage 224 may be implemented as a single entity (such as a single computing apparatus—be it a server or the like).

Functionalities of each one of the text acquiring module 202, the parsing module 204, the parsing parameter database 206, the context-independent relation value generating module 208, the context-dependent relation value module 210, the value weight processing module 212, the concept meaning value determining module 216, the sentence meaning value determining module 218, the ranking module 220, the summary generating module 222 and the summary storage 224, as well as data and/or information processed or stored therein will be further described below.

In accordance with embodiments of the present technology, the text acquiring module 202 is configured to acquire an indication of the digital text 302 to be processed. As has been alluded to above, the digital text 302 comprises the plurality of sentences 304.

How the text acquiring module 202 acquires the indication of the digital text 302 is not particularly limited. For example, the text acquiring module 202 can acquire the indication of the digital text 302 from the document-source-server 108 in response to a request from the client device 106. The client device 106 can generate such a request in response to a user-command received from the user 112. For example, the user 112 may be desirous of accessing the one or more digital documents 110 stored by the document-source-server 108 and to acquire a summary of the digital text 302 representing same.

Alternatively, the text acquiring module 202 can acquire the indication of the digital text 302 from the document-source-server 108 in response to another operation performed by the processing server 102. For example, in those embodiment where the processing server 102 also executed functionality of a search engine, the text acquiring module 202 can acquire the indication of the digital text 302 directly or indirectly from the document-source-server 108 as part of processing a search request received from the client device 106 and as part of generating a SERP having a snippet that contains a summary of the one or more digital documents 110. The processing server 102, as part of generating the SERP, typically generates a "snippet" of the digital text 302, the snippet including a document summary to be presented as part of the SERP.

The parsing module 204 receives the indication of the digital text 302. The parsing module 204 is configured to parse each of plurality of sentences 304 into one or more concept phrases 310. A given concept phrase 312 of the one or more concept phrases 310 including one or more words 308.

The parsing module 204 executes parsing by applying at least one parsing parameter 214. As will be explained shortly, the at least one parsing parameter 214 can be language specific. To that end, the parsing module 204 has access to the parsing parameter database 206. The parsing parameter database 206 stores an indication of one or more parsing parameter 214. Generally speaking, the one or more parsing parameter 214 enable the parsing module 204 to identify the one or more concept phrases 310. The given concept phrase 312 is a meaningful logical entity within the digital text 302. Just as an example, the given concept phrase 312 can be: "modern computer systems", "information retrieval methods", "wooden chair", "umbrella" and the like.

The one or more parsing parameter 214 can be based on specific one or more heuristic rules. The one or more heuristics rule can be grammatical rules. As an example, the grammatical rule can be that the given concept phrase 312 is a noun phrase consisting of one or more adjacent words, the words being nouns, adjectives or a certain types of conjunctions. Each concept phrase 312 can be identified by a "trigger word", which can be a main word of the concept phrase 312. The main word can be determined based on the position of the word within the given concept phrase 312.

Specific rules for identifying the trigger word vary (i.e. the specific rules can be language-specific). In Russian language, the main word is typically the leftmost noun within the given concept phrase 312. In English language, it may be the rightmost noun (if there are no prepositions such as "of"). For example: (i) in the concept phrase 312 "article text automatic TRANSLATION"—the capitalized word "translation" is the main word, being the rightmost word or (ii) in the in the concept phrase 312 "automatic TRANSLATION of article text"—the capitalized word "translation" is the main word, being the leftmost noun before the preposition.

Alternatively, the determination and applications of the one or more parsing parameter 214 can be executed by a machine learning algorithm.

A specific technical effect of the approach using one or more parsing parameter 214 is the ability to identify the one or more concept phrases 310 without use of dictionaries (thus, not requiring populating, updating, maintaining and storing of the dictionaries).

In some embodiments of the present technology, the parsing module 204 is further configured to normalize each given concept phrase 312. In some embodiments of the present technology, each word 308 of the given concept phrase 312 is normalized to its normal form (for example, endings and sometimes suffixes can discarded). In some embodiments, the given concept phrase 312 is normalized to its lemma. In some embodiments, some or all of the words 308 of the given concept phrase 312 can be brought to their main (most commonly used) synonym using a thesaurus database (not depicted).

In some embodiments of the present technology, the parsing module 204 is configured to normalize the trigger word 308 using a first normalization routine and to normalize the remainder of the words 308 in the given concept phrase 312 using a second normalization routine. For example, the second normalization routine can be removal (or interchange with an infinitive form thereof) of suffixes and endings, while the first normalization technique can be removal (or interchange with an infinitive form thereof) of endings only.

In some embodiments, the parsing module 204 further re-arranges the words 308 of the given concept phrase 312 such that a re-arranged version of the concept phrase 312 has the main word 308 as a first word, followed by a remainder of normalized words 308 ranked in an alphabetical order. Naturally, the parsing module 204 can re-arrange the words 308 using a different approach. A special technical effect of the parsing module 204 normalizing and/or re-arranging the one or more concept phrases 310 is the ability to more efficiently determine similarity between different ones of the one or more concept phrases 310 (the process to be described below).

Just as an example, a first given concept phrase 312 can be "information search systems" and a second given concept phrase 312 can be "system for information searching". Using the various techniques described above, the parsing module 204 normalizes the first given concept phrase 312 to "system information search" and the second given concept phrase 312 to "system information search".

The context-independent relation value generating module 208 is configured to execute a first analysis to generate a context-independent relation (CIR) value for the given concept phrase 312 of the one or more concept phrases 310. Generally speaking, the CIR value represents a first ratio of a co-inclusion of: (i) at least one word 308 of the given concept phrase 312 and (ii) at least one word 308 of each of the remaining concept phrases 312 of the one or more concept phrases 310.

The CIR value can be used by the context-independent relation value generating module 208 to determine a relationship between the first given concept phrase 312 and a second given concept phrase 312.

Just as an example, a first given concept phrase 312 can be "computer technology" and a second given concept phrase 312 can be "modern computer technologies". The CIR value of the second given concept phrase 312 relative to the first given concept phrase 312 is 1.00 (one point zero zero), calculated as two ("computer", "technology") divided by two ("computer technology"). In other words, two words of the second given concept phrase 312 are included in the first given concept phrase 312, the first given concept phrase 312 only including the two co-occurring words.

The CIR value of the first given concept phrase 312 relative to the second given concept phrase 312 is 0.67 (zero point six seven), calculated as two ("computer", "technology") divided by three ("modern computer technologies"). In other words, two words of the first given concept phrase 312 are present in the second given concept phrase 312, the second concept phrase 312 having more words than just the co-occurring words Where out of two concept phrases 312—a first one is associated with the CIR value 1 and the other one associated with the CIR value less than 1—such a CIR value relationship is indicative of a genus-species relationship between the first concept phrase 312 and the second concept phrase 312.

Just as another example, a first given concept phrase 312 can be "modern computer technologies" and a second given concept phrase 312 can be "advanced computer technologies for management". The CIR value of the second given concept phrase 312 relative to the first given concept phrase 312 is 0.67 (zero point six seven), calculated as two ("computer", "technology") divided by three ("modern computer technologies"). In other words, two words of the second given concept phrase 312 are included in the first given concept phrase 312, the first given concept phrase 312 having more words than just the co-occurring words The CIR value of the first given concept phrase 312 relative to the second given concept phrase 312 is 0.50 (zero point five zero), calculated as two ("computer", "technology") divided by four ("advanced computer technologies [for] management"). In other words, two words of the first given concept phrase 312 are present in the second given concept phrase 312, the second concept phrase 312 having more words than just the co-occurring words.

Where out of two concept phrases 312—a first one is associated with the CIR value of under 1 and the other one is also associated with the CIR value of less than 1—such a CIR value relationship is indicative of a associative relationship between the first concept phrase 312 and the second concept phrase 312.

Just as an example, a first given concept phrase 312 can be "information search systems" and a second given concept phrase 312 can be "systems for information searching". The CIR values of both the first given concept phrase 312 relative to the second given concept phrase 312 and the second given concept phrase 312 to the first given concept phrase is 1.00 (one point zero zero), calculated as 3 ("system", "information" and "search") divided by three ("system information search", when normalized and re-arranged).

Where out of two concept phrases 312—a first one is associated with the CIR value 1 and the other one associated with the CIR value less 1—such a CIR value relationship is indicative of a equivalent relationship between the first concept phrase 312 and the second concept phrase 312.

The context-independent relation value generating module 208 then repeats the process for the given concept phrase 312 relative to all other concept phrases 312 of the one or more concept phrases 310. Next, the parsing module 204 repeats the process for another given concept phrase 312 relative to all other concept phrases 312 of the one or more concept phrases 310.

The context-independent relation value generating module 208 can then generate a first matrix of so-determined context-independent logical relationships between a given concept phrase 312 relative to all other concept phrases 312 of the one or more concept phrases 310.

The context-dependent relation value module 210 can execute a second analysis to generate a context-dependent relation (CDR) value for the given concept phrase 312. Generally speaking, the CDR value represents a second ratio of: (i) a number of sentences where the given concept phrase 312 co-occurs with another concept phrase 312 of the one or more concept phrases 310 to a total number of the plurality of sentences 304 that contain the other concept phrase 312 within the digital text 302.

The context-dependent relation value module 210 can then generate a second matrix of so-determined context-dependent logical relationships between a given concept phrase 312 relative to all other concept phrases 312 of the one or more concept phrases 310.

The value weight processing module 212 is configured to determine a total CIR weight and a total CDR weight for each of the one or more concept phrases 310. In some embodiments of the present technology, the value weight processing module 212 uses the above-described first matrix and the second matrix to sum up, for the given concept phrase 312, its respective CIR values and CDR values to generate, respectively, the total CIR weight and the total CDR weight.

The concept meaning value determining module 216 is configured to determine, for each of the concept phrases 312, a concept meaning value, based at least in part on its respective total CIR weight and the total CDR weight. In some embodiments of the present technology, the concept meaning value determining module 216 determines the concept meaning value by multiplying the respective total CIR weight and the total CDR weight of the given concept phrase 312. Naturally, the concept meaning value determining module 216 can determine the concept meaning value by applying a different function.

The sentence meaning value determining module 218 is configured to determine, for the given sentence 306 of the plurality of sentences 304, a sentence meaning value. In some embodiments of the present technology, the sentence meaning value determining module 218 determines the sentence meaning value by adding all the concept meaning values of the concept phrases 312 that make up the given sentence 306 and then dividing the result by the number of concept phrases 312 within the given sentence. Naturally, the sentence meaning value determining module 218 can determine the sentence meaning value by applying a different function.

The ranking module 220 is configured to rank each sentence 306 based at least on the determined sentence meaning value. In some embodiments, the ranking module 220 ranks each sentence 306 within the plurality of sentences 306 in a decreasing order of the associated sentence meaning value. In other words, the ranking module 220 orders the plurality of sentences 306 in a decreasing order from the most important sentence 306 to the least important sentence 306, the importance of the sentence being determined by its associated sentence meaning value.

The summary generating module 222 is configured to generate a summary of the digital text 302. The summary generating module 222 generates the summary of the digital text 302 by extracting at least one sentence 306 from the digital text 302 based on the determined ranking of the at least one sentence 306. In some embodiments of the present technology, the summary generating module 222 generates the summary of the digital text 302 by selecting a pre-determined number of sentences 306 having higher ranking based on the associated sentence meaning value. In some embodiments of the present technology, the number of sentences 306 so picked is predetermined by the system administrator. In other embodiments, the number of sentences 306 so picked is predetermined or selected by the user 112.

As such, in other embodiments of the present technology, the summary generating module 222 can receive an indication of a pre-selected number of sentences 306 to be included into the summary. For example, this indication can be received from the client device 106. Alternatively, this indication can be generated by the processing server 102 itself.

In some embodiments of the present technology, the summary generating module 222 generates the summary of the digital text 302 by using the pre-determined number of sentences 306 while preserving the order of the sentences within the digital text 302.

The summary generating module 222 is further configured to store the summary in the summary storage 224. More specifically, the summary generating module 222 stores the summary in the summary storage 224 in association with the digital text 302. This association with the digital text 302 can be implemented as storing the summary in association with an ID of the digital text 302, as an example.

Figure 4:
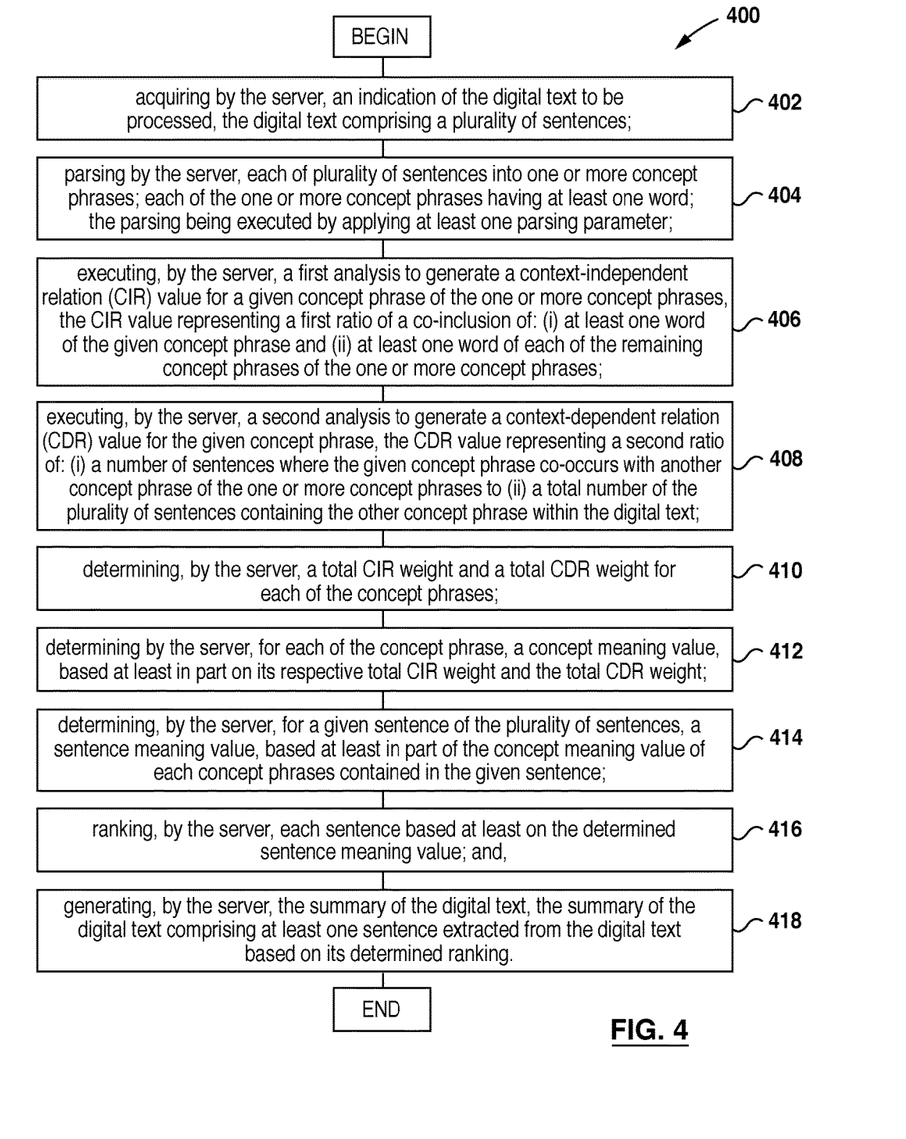
FIG. 4 depicts a flow chart of a method for generating a summary of a text, the method being executed by the processing server of FIG. 2.

Given the architecture described above, as well as examples presented above, it is possible to execute a computer-implemented method for generating a summary of a digital text 302. With reference to FIG. 4, there is depicted a flow chart of a method 400, the method 400 being executable in accordance with non-limiting embodiments of the present technology. The method 900 is executable on the processing server 102. It should be noted that the various steps described above as being performed by the various components of the processing server 102 (i.e. the text acquiring module 202, the parsing module 204, the parsing parameter database 206, the context-independent relation value generating module 208, the context-dependent relation value module 210, the value weight processing module 212, the concept meaning value determining module 216, the sentence meaning value determining module 218, the ranking module 220, the summary generating module 222 and the summary storage 224) will be described as being performed by the processing server 102 while describing the method 400. It should also be recalled that the processing server 102 is coupled to the communication network 104.

402-acquiring by the server, an indication of the digital text to be processed, the digital text comprising a plurality of sentences The method 400 starts at step 402, where the processing server 102 acquires an indication of the digital text 302 to be processed. It should be recalled that the digital text 302 comprises the plurality of sentences 304.

404-parsing by the server, each of plurality of sentences into one or more concept phrases, each of the one or more concept phrases having at least one word; the parsing being executed by applying at least one parsing parameter The method 400 continues to step 404, where the processing server 102 parses each of plurality of sentences 304 into one or more concept phrases 310. The step of parsing 404 is executed by applying at least one parsing parameter 214. The at least one parsing parameter 214 can be language-specific. The parsing 404 is executed such that each concept phrase 312 that is so defined is made up of at least one word 308.

In some embodiments of the method 400, the at least one parsing parameter 214 is based on at least one heuristic. As such, in some embodiments of the method 400, the method 400 further comprises, prior to the step of acquiring 402 the indication of the digital text 302, a step of acquiring at least one heuristic and storing the at least one heuristic in a memory of the processing server 102.

In some embodiments of the method 400, the concept phrase 312 comprises a meaningful logical entity that is formed of the at least one word 308. The at least one parsing parameter 214 can be used by the processing server 102 to identify the meaningful logical entity based on the at least one word 308 being a noun or a noun-based grammatical entity (or any other suitable grammatical rule that forms part of the at least one parsing parameter 214).

In some embodiments of the method 400, the first analysis is a linguistic analysis. In some embodiments, the first analysis is a non-ontology based analysis (i.e. it does not rely on ontology dictionaries or other sources, but rather analyzes the words 308 themselves).

406-executing, by the server, a first analysis to generate a context-independent relation (CIR) value for a given concept phrase of the one or more concept phrases, the CIR value representing a first ratio of a co-inclusion of: (i) at least one word of the given concept phrase and (ii) at least one word of each of the remaining concept phrases of the one or more concept phrases The method 400 continues to step 406, where the processing server 102 executes a first analysis to generate a context-independent relation (CIR) value for the given concept phrase 312 of the one or more concept phrases 310. The CIR value represents a first ratio of a co-inclusion of: (i) at least one word 308 of the given concept phrase 312 and (ii) at least one word 308 of each of the remaining concept phrases 312 of the one or more concept phrases 310.

In some embodiments of the method 400, the step 406 comprises generating the context-independent relation (CIR) value for the given concept phrase 312 relative to a target phrase 312 which is another one of the one or more concept phrases 312 and the process of generating comprises: (i) determining a number of words 308 of the given concept phrase 312 that are also present in the target phrase 312 and (ii) dividing the number of co-occurring words 308 by a total number of words 308 in the target phrase 312.

In some embodiments of the method 400, the method 400 further comprises analyzing the CIR value to determine a relationship of the associated given concept phrase 312 and another given one of the remaining concept phrases 312 of the one or more concept phrases 310 to be one of: genus-species relationship, equivalent relationship and associative relationship.

408-executing, by the server, a second analysis to generate a context-dependent relation (CDR) value for the given concept phrase, the CDR value representing a second ratio of: (i) a number of sentences where the given concept phrase co-occurs with another concept phrase of the one or more concept phrases to a total number of the plurality of sentences containing the other concept phrase within the digital text The method 400 continues to step 408, where the processing server 102 executes a second analysis to generate a context-dependent relation (CDR) value for the given concept phrase 312. The CDR value represents a second ratio of: (i) a number of sentences 306 where the given concept phrase 312 co-occurs with another concept phrase 312 of the one or more concept phrases 310 to (ii) a total number of the plurality of sentences 304 containing the other concept phrase 312 within the digital text 302.

In some embodiments of the method 400, the method 400 further comprises, prior to the step of determining 406 the CIR value and the step of determining 408 the CDR value, executing a step of normalizing each of the at least one words 308. In some embodiments of the method 400, the method 400 further comprises, prior to the step of determining 406 the CIR value and the step of determining 408 the CDR value, executing a step of determining common synonyms between a given word 308 of a first concept phrase 312 and another given word 308 of a second concept phrase 312.

410-determining by the server, a total CIR weight and a total CDR weight for each of the concept phrases The method 400 continues to step 410, where the processing server 102 determines a total CIR weight and a total CDR weight for each of the concept phrases 312.

In some embodiments of the method 400, the step of determining 410 the total CIR weight for the given concept phrase 312 comprises aggregating a plurality of CIR values of the given concept phrase 312, a given one of the plurality of CIR values being in respect to another given one of at least some of the remaining concept phrases 312 within the digital text 302. In some embodiments of the method 400, at least some of the remaining concept phrases 312 within the digital text 302 comprise those remaining concept phrases 312 that have been determined, by the first analysis, to be semantically linked to the given concept phrase 312. In some embodiments of the method 400, at least some of the remaining concept phrases 312 within the digital text 302 comprise an entirety of the remaining concept phrases 312.

In some embodiments of the method 400, the determining 410 the total CDR weight for the given concept phrase 312 comprises aggregating a plurality of CDR value of the given concept phrase 312, a given one of the plurality of CDR values being in respect to another given one of the remaining co-occurring concept phrases 312 within the digital text 302.

412-determining by the server, for each of the concept phrase, a concept meaning value, based at least in part on its respective total CIR weight and the total CDR weight The method 400 continues to step 412, where the processing server 102 determines, for each of the concept phrase 312, a concept meaning value. The step of determining 412 is based at least in part on its respective total CIR weight and the total CDR weight.

In some embodiments of the method 400, the determining 412 the concept meaning value for the given concept phrase 312 comprises aggregating the value of the total CIR weight and the value of the total CDR weight of the given concept phrase 312. In some embodiments of the method 400, the step of aggregating the value of the total CIR weight and the value of the total CDR weight of the given concept phrase 312 comprises multiplying the total CIR weight and the value of the total CDR weight. Naturally, other suitable functions can be applied to execute the aggregation.

414-determining by the server, for a given sentence of the plurality of sentences, a sentence meaning value, based at least in part of the concept meaning value of each concept phrase contained in the given sentence The method 400 continues to step 414, where the processing server 102 determines, for the given sentence 306 of the plurality of sentences 304, a sentence meaning value. The step of determining 414 is based at least in part of the concept meaning value of each concept phrase 312 contained in the given sentence 306.

In some embodiments of the method 400, the determining 414 the sentence meaning value for the given sentence 306 comprises aggregating a respective concept meaning value of each concept phrase 312 contained in the given sentence 306. In some embodiments of the method 400, the step of aggregating the respective concept meaning value of each concept phrase 312 contained in the given sentence 306 comprises (i) adding the respective concept meaning value of each concept phrase 312 contained in the given sentence 306 to generate a total value and (ii) sub-dividing the total value by the number of concept phases 312 within the given sentence 306.

416-ranking by the server, each sentence based at least on the determined sentence meaning value The method 400 continues to step 416, where the processing server 102 ranks each sentence 306 based at least on the determined sentence meaning value.

418-generating by the server, the summary of the digital text, the summary of the digital text comprising at least one sentence extracted from the digital text based on its determined ranking The method 400 continues to step 418, where the processing server 102 generates the summary of the digital text 302. The summary of the digital text 302 comprises at least one sentence 306 extracted from the digital text based on its determined ranking (as determined in step 414 and as ranked in step 416).

In some embodiments of the present technology, the method 400 further includes a step of storing, in a memory, the summary of the digital text 302 in association with the digital text 302.

In some embodiments of the method 400, the step of generating 418 the summary of the digital text 302 comprises selecting a pre-selected number of sentences 306 from the plurality of sentences 304 based on their respective sentence meaning value. In some embodiments of the method 400, the step of selecting further comprises preserving an order the pre-selected number of sentences 306 follow in the digital text 302. In some embodiments of the method 400, the method 400 further comprises, prior to the step of acquiring 402 the indication of the digital text 302 to be processed, executing a step of acquiring an indication of the pre-selected number of sentences.

In some embodiments of the method 400, the step of selecting the pre-selected number of sentences 306 from the plurality of sentences 304 based on their respective sentence meaning value comprises: (i) selecting a first subset of the pre-selected number of sentences 306 from a first portion of the digital text 302 (such as a top half of the digital text 302) and (ii) selecting a second subset of the pre-selected number of sentences 306 from a second portion of the digital text 302 (such as a second half of the digital text 302).

In some embodiments of the present technology, as part of step 418, instead of (or in addition to) generating by the server 102, the summary of the digital text 302, the server 102 assigns a topic category to the digital text 302. The topic category can be based on at least one higher ranked concept phrase 312. The relationship between the topic category and the at least one concept phrase 312 can be pre-determined by the system administrator or determined by a machine learning algorithm executed by the processing server 102.

The method 400 then terminates.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

One skilled in the art will appreciate when the instant description refers to "receiving data" from a user that the electronic device or another electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology will become apparent to those skilled in the art. The foregoing description is intended to be exemplary rather than limiting. The scope of the present technology is therefore intended to be limited solely by the scope of the appended claims.

Some embodiments of the present technology described above can therefore be summarized as follows, structured in numbered clauses.

CLAUSE 1. A computer-implemented method (400) for generating a summary of a digital text (302), the method (400) executable on a server (102), the server (102) coupled to a communication network (104), the method (400) comprising:

acquiring (402) by the server (102), an indication of the digital text (302) to be processed, the digital text (302) comprising a plurality of sentences (304);

parsing (404) by the server (102), each of plurality of sentences (304) into one or more concept phrases (310), each of the one or more concept phrases (310) having at least one word (308); the parsing (404) being executed by applying at least one parsing parameter (214);

executing (406), by the server (102), a first analysis to generate a context-independent relation (CIR) value for a given concept phrase (312) of the one or more concept phrases (310), the CIR value representing a first ratio of a co-inclusion of: (i) at least one word (308) of the given concept phrase (312) and (ii) at least one word (308) of each of the remaining concept phrases (312) of the one or more concept phrases (310);

executing (408), by the server (102), a second analysis to generate a context-dependent relation (CDR) value for the given concept phrase (312), the CDR value representing a second ratio of: (i) a number of sentences (306) where the given concept phrase (312) co-occurs with another concept phrase (312) of the one or more concept phrases (310) to (ii) a total number of the plurality of sentences (304) containing the other concept phrase (312) within the digital text (302);

determining (410) by the server (102), a total CIR weight and a total CDR weight for each of the concept phrases (312);

determining (412) by the server (102), for each of the concept phrase (312), a concept meaning value, based at least in part on its respective total CIR weight and the total CDR weight;

determining (414) by the server (102), for a given sentence (306) of the plurality of sentences (304), a sentence meaning value, based at least in part of the concept meaning value of each concept phrase (312) contained in the given sentence (306);

ranking (416) by the server (102), each sentence (306) based at least on the determined sentence meaning value; and generating (418) by the server (102), the summary of the digital text (302), the summary of the digital text (302) comprising at least one sentence (306) extracted from the digital text (302) based on its determined ranking.

CLAUSE 2. The computer-implemented method (400) of clause 1, further comprising storing, in a memory, the summary of the digital text (302) in association with the digital text (302).

CLAUSE 3. The computer-implemented method (400) of any one of clauses 1 or 2, wherein the at least one parsing parameter (214) is based on at least one heuristic.

CLAUSE 4. The computer-implemented method (400) of clause 3, further comprising prior to the acquiring (402) the indication of the digital text (302) to be processed, acquiring by the server (102) at least one heuristic and storing by the server the at least one heuristic.

CLAUSE 5. The computer-implemented method (400) of any one of clauses 1 to 4, wherein the concept phrase (312) comprises a meaningful logical entity that is formed of the at least one word (308).

CLAUSE 6. The computer-implemented method (400) of clause 5, wherein the at least one parsing parameter (214) identifies the meaningful logical entity based on the at least one word (308) being a noun.

CLAUSE 7. The computer-implemented method (400) of clause 5, wherein the at least one parsing parameter (214) identifies the meaningful logical entity based on the at least one word (308) being a noun-based grammatical entity.

CLAUSE 8. The computer-implemented method (400) of clause 5, wherein the method (400) further comprises, prior to the determining (406) the CIR value and the determining (408) the CDR value, normalizing each of the at least one word (308).

CLAUSE 9. The computer-implemented method (400) of clause 5, wherein the method (400) further comprises, prior to the determining (406) the CIR value and the determining (408) the CDR value, determining common synonyms between a given word (308) of a first concept phrase (312) and another given word (308) of a second concept phrase (312).

CLAUSE 10. The computer-implemented method (400) of any one of clauses 1 to 9, wherein the first analysis comprises a non-ontology based analysis.

CLAUSE 11. The computer-implemented method (400) of any one of clauses 1 to 10, wherein the method (400) further comprises analyzing the CIR value to determine a relationship of the associated given concept phrase (312) and another given one of the remaining concept phrases (312) of the one or more concept phrases (310) to be one of: genus-species relationship, equivalent relationship and associative relationship.

CLAUSE 12. The computer-implemented method (400) of any one of clauses of 1 to 10, wherein the determining (412) the total CIR weight for the given concept phrase (312) comprises aggregating a plurality of CIR values of the given concept phrase (312), a given one of the plurality of CIR values being in respect to another given one of at least some of the remaining concept phrases (312) within the digital text (302).

CLAUSE 13. The computer-implemented method (400) of clause 12, wherein at least some of the remaining concept phrases (312) within the digital text (302) comprise those remaining concept phrases (312) that have been determined, by the first analysis, to be semantically linked to the given concept phrase (312).

CLAUSE 14. The computer-implemented method (400) of clause 12, wherein at least some of the remaining concept phrases (312) within the digital text (302) comprise an entirety of the remaining concept phrases (312).

CLAUSE 15. The computer-implemented method (400) of any one of clauses 1 to 14, wherein the determining (412) the total CDR weight for the given concept phrase (312) comprises aggregating a plurality of CDR value of the given concept phrase (312), a given one of the plurality of CDR values being in respect to another given one of the remaining co-occurring concept phrases (312) within the digital text (302).

CLAUSE 16. The computer-implemented method (400) of any one of clauses 1 to 15, wherein the determining the concept meaning value for the given concept phrase (312) comprises aggregating the value of the total CIR weight and the value of the total CDR weight of the given concept phrase (312).

CLAUSE 17. The computer-implemented method (400) of clause 16, wherein the aggregating the value of the total CIR weight and the value of the total CDR weight of the given concept phrase (312) comprises multiplying the total CIR weight and the value of the total CDR weight.

CLAUSE 18. The computer-implemented method (400) of any one of clauses 1 to 17, wherein the determining (414) the sentence meaning value for the given sentence (306) comprises aggregating a respective concept meaning value of each concept phrase (312) contained in the given sentence (306).

CLAUSE 19. The computer-implemented method (400) of clause 18, wherein the aggregating the respective concept meaning value of each concept phrase (312) contained in the given sentence (306) comprises (i) adding the respective concept meaning value of each concept phrase (312) contained in the given sentence (306) to generate a total value and (ii) sub-dividing the total value by the number of concept phases (312) within the given sentence (306).

CLAUSE 20. The computer-implemented method (400) of any one of clauses 1 to 19, wherein the generating (418) the summary of the digital text (302) comprises selecting a pre-selected number of sentences (306) from the plurality of sentences (304) based on their respective sentence meaning value.

CLAUSE 21. The method (400) of clause 20, wherein the selecting further comprising preserving an order the pre-selected number of sentences (306) follow in the digital text (302).

CLAUSE 22. The computer-implemented method (400) of clause 20, further comprising, prior to the acquiring (402) the indication of the digital text (302) to be processed, acquiring an indication of the pre-selected number of sentences.

CLAUSE 23. The computer-implemented method (400) of clause 20, wherein the selecting the pre-selected number of sentences (306) from the plurality of sentences (306) based on their respective sentence meaning value comprises: (i) selecting a first subset of the pre-selected number of sentences (306) from a first portion of the digital text (302) and (ii) selecting a second subset of the pre-selected number of sentences (306) from a second portion of the digital text (302).

CLAUSE 24. The method (400) of any one of clauses 1 to 23, wherein the executing (406) the first analysis to generate the context-independent relation (CIR) value for the given concept phrase (312) relative to a target phrase (312) which is another one of the one or more concept phrases (312) comprises: (i) determining a number of words (308) of the given concept phrase (312) that are also present in the target phrase (312) and (ii) dividing the number of co-occurring words (308) by a total number of words (308) in the target phrase (312).

CLAUSE 25. A computer-implemented method (400) for generating a summary of a digital text (302), the method executable on a server (102), the server (102) coupled to a communication network (104), the method (400) comprising:

acquiring (402) by the server (102), an indication of the digital text (302) to be processed, the digital text (302) comprising a plurality of sentences (304);

parsing (404) by the server (102), each of plurality of sentences (304) into one or more concept phrases (310), each of the one or more concept phrases (310) having at least one word (308); the parsing (404) being executed by applying at least one parsing parameter (214);

executing (406), by the server (102), a first analysis to generate a context-independent relation (CIR) value for a given concept phrase (312) of the one or more concept phrases (310), the CIR value representing a first ratio of a co-inclusion of: (i) at least one word (308) of the given concept phrase (312) and (ii) at least one word (308) of each of the remaining concept phrases (312) of the one or more concept phrases (310);

executing (408), by the server (102), a second analysis to generate a context-dependent relation (CDR) value for the given concept phrase (312), the CDR value representing a second ratio of: (i) a number of sentences (306) where the given concept phrase (312) co-occurs with another concept phrase (312) of the one or more concept phrases (310) to (ii) a total number of the plurality of sentences (304) containing the other concept phrase (312) within the digital text (302);

determining (410) by the server (102), a total CIR weight and a total CDR weight for each of the concept phrases (312);

determining (412) by the server (102), for each of the concept phrase (312), a concept meaning value, based at least in part on its respective total CIR weight and the total CDR weight;

determining (414) by the server (102), for a given sentence (306) of the plurality of sentences (304), a sentence meaning value, based at least in part of the concept meaning value of each concept phrase (312) contained in the given sentence (306);

ranking (416) by the server (102), each sentence (306) based at least on the determined sentence meaning value; and assigning, by the server, a topic category to the digital text (302), the topic category being based on at least one higher ranked concept phrase (312).

CLAUSE 26. A server (102) comprising:

a communication interface for communication with an client device (106) via a communication network (104), a processor operationally connected with the communication interface, the processor configured to:

acquire an indication of a digital text to be processed in order to generate a summary thereof, the digital text comprising a plurality of sentences;

parse each of plurality of sentences into one or more concept phrases, each of the one or more concept phrases having at least one word by applying at least one parsing parameter;

execute a first analysis to generate a context-independent relation (CIR) value for a given concept phrase of the one or more concept phrases, the CIR value representing a first ratio of a co-inclusion of: (i) at least one word of the given concept phrase and (ii) at least one word of each of the remaining concept phrases of the one or more concept phrases;

execute a second analysis to generate a context-dependent relation (CDR) value for the given concept phrase, the CDR value representing a second ratio of: (i) a number of sentences where the given concept phrase co-occurs with another concept phrase of the one or more concept phrases to (ii) a total number of the plurality of sentences containing the other concept phrase within the digital text;

determine a total CIR weight and a total CDR weight for each of the concept phrases;

determine, for each of the concept phrase, a concept meaning value, based at least in part on its respective total CIR weight and the total CDR weight;

determine, for a given sentence of the plurality of sentences, a sentence meaning value, based at least in part of the concept meaning value of each concept phrase contained in the given sentence;

rank each sentence based at least on the determined sentence meaning value; and generate the summary of the digital text, the summary of the digital text comprising at least one sentence extracted from the digital text based on its determined ranking.

The invention claimed is:

1. A computer-implemented method for generating a summary of a digital text, the method executable on a server, the server coupled to a communication network, the method comprising:

acquiring by the server, an indication of the digital text to be processed, the digital text comprising a plurality of sentences;

parsing by the server, each of plurality of sentences into one or more concept phrases, each of the one or more concept phrases having at least one word; the parsing being executed by applying at least one parsing parameter;

executing, by the server, a first analysis to generate a context-independent relation (CIR) value for a given concept phrase of the one or more concept phrases, the CIR value representing a first ratio of a co-inclusion of: (i) at least one word of the given concept phrase and (ii) at least one word of each of the remaining concept phrases of the one or more concept phrases;

executing, by the server, a second analysis to generate a context-dependent relation (CDR) value for the given concept phrase, the CDR value representing a second ratio of: (i) a number of sentences where the given concept phrase co-occurs with another concept phrase of the one or more concept phrases to (ii) a total number of the plurality of sentences containing the other concept phrase within the digital text;

determining by the server, a total CIR weight and a total CDR weight for each of the concept phrases;

determining by the server, for each of the concept phrase, a concept meaning value, based at least in part on its respective total CIR weight and the total CDR weight;

determining by the server, for a given sentence of the plurality of sentences, a sentence meaning value, based at least in part of the concept meaning value of each concept phrase contained in the given sentence;

ranking by the server, each sentence based at least on the determined sentence meaning value; and, generating by the server, the summary of the digital text, the summary of the digital text comprising at least one sentence extracted from the digital text based on its determined ranking.

2. The computer-implemented method of claim 1, further comprising storing, in a memory, the summary of the digital text in association with the digital text.

3. The computer-implemented method of claim 1, wherein the at least one parsing parameter is based on at least one heuristic.

4. The computer-implemented method of claim 1, wherein the concept phrase comprises a meaningful logical entity that is formed of the at least one word.

5. The computer-implemented method of claim 4, wherein the at least one parsing parameter identifies the meaningful logical entity based on the at least one word being one of a noun and a noun-based grammatical entity.

6. The computer-implemented method of claim 4, wherein the method further comprises, prior to the determining the CIR value and the determining the CDR value, executing at least one of: normalizing each of the at least one word and determining common synonyms between a given word of a first concept phrase and another given word of a second concept phrase.

7. The computer-implemented method of claim 1, wherein the first analysis comprises a non-ontology based analysis.

8. The computer-implemented method of claim 1, wherein the method further comprises analyzing the CIR value to determine a relationship of the associated given concept phrase and another given one of the remaining concept phrases of the one or more concept phrases to be one of: genus-species relationship, equivalent relationship and associative relationship.

9. The computer-implemented method of claim 1, wherein the determining the total CIR weight for the given concept phrase comprises aggregating a plurality of CIR values of the given concept phrase, a given one of the plurality of CIR values being in respect to another given one of at least some of the remaining concept phrases within the digital text.

10. The computer-implemented method of claim 9, wherein at least some of the remaining concept phrases within the digital text comprise one of: (i) those remaining concept phrases that have been determined, by the first analysis, to be semantically linked to the given concept phrase and (ii) an entirety of the remaining concept phrases.

11. The computer-implemented method of claim 1, wherein the determining the total CDR weight for the given concept phrase comprises aggregating a plurality of CDR value of the given concept phrase, a given one of the plurality of CDR values being in respect to another given one of the remaining co-occurring concept phrases within the digital text.

12. The computer-implemented method of claim 1, wherein the determining the concept meaning value for the given concept phrase comprises aggregating the value of the total CIR weight and the value of the total CDR weight of the given concept phrase.

13. The computer-implemented method of claim 12, wherein the aggregating the value of the total CIR weight and the value of the total CDR weight of the given concept phrase comprises multiplying the total CIR weight and the value of the total CDR weight.

14. The computer-implemented method of claim 1, wherein the determining the sentence meaning value for the given sentence comprises aggregating a respective concept meaning value of each concept phrase contained in the given sentence and wherein the aggregating the respective concept meaning value of each concept phrase contained in the given sentence comprises (i) adding the respective concept meaning value of each concept phrase contained in the given sentence to generate a total value and (ii) sub-dividing the total value by the number of concept phases within the given sentence.

15. The computer-implemented method of claim 1, wherein the generating the summary of the digital text comprises selecting a pre-selected number of sentences from the plurality of sentences based on their respective sentence meaning value.

16. The method of claim 15, wherein the selecting further comprising preserving an order the pre-selected number of sentences follow in the digital text.

17. The computer-implemented method of claim 16, further comprising, prior to the acquiring the indication of the digital text to be processed, acquiring an indication of the pre-selected number of sentences and wherein the selecting the pre-selected number of sentences from the plurality of sentences based on their respective sentence meaning value comprises: (i) selecting a first subset of the pre-selected number of sentences from a first portion of the digital text and (ii) selecting a second subset of the pre-selected number of sentences from a second portion of the digital text.

18. The method of claim 1, wherein the executing the first analysis to generate the context-independent relation (CIR) value for the given concept phrase relative to a target phrase which is another one of the one or more concept phrases comprises: (i) determining a number of words of the given concept phrase that are also present in the target phrase and (ii) dividing the number of co-occurring words by a total number of words in the target phrase.

19. A computer-implemented method for generating a summary of a digital text, the method executable on a server, the server coupled to a communication network, the method comprising:
    acquiring by the server, an indication of the digital text to be processed, the digital text comprising a plurality of sentences;
    parsing by the server, each of plurality of sentences into one or more concept phrases, each of the one or more concept phrases having at least one word; the parsing being executed by applying at least one parsing parameter;
    executing, by the server, a first analysis to generate a context-independent relation (CIR) value for a given concept phrase of the one or more concept phrases, the CIR value representing a first ratio of a co-inclusion of: (i) at least one word of the given concept phrase and (ii) at least one word of each of the remaining concept phrases of the one or more concept phrases;
    executing, by the server, a second analysis to generate a context-dependent relation (CDR) value for the given concept phrase, the CDR value representing a second ratio of: (i) a number of sentences where the given concept phrase co-occurs with another concept phrase of the one or more concept phrases to (ii) a total number of the plurality of sentences containing the other concept phrase within the digital text;
    determining by the server, a total CIR weight and a total CDR weight for each of the concept phrases;
    determining by the server, for each of the concept phrase, a concept meaning value, based at least in part on its respective total CIR weight and the total CDR weight;
    determining by the server, for a given sentence of the plurality of sentences, a sentence meaning value, based at least in part of the concept meaning value of each concept phrase contained in the given sentence;
    ranking by the server, each sentence based at least on the determined sentence meaning value; and,
    assigning, by the server, a topic category to the digital text, the topic category being based on at least one higher ranked concept phrase.

20. A server comprising:
    a communication interface for communication with an electronic device via a communication network,
    a processor operationally connected with the communication interface, the processor configured to:
        acquire an indication of a digital text to be processed in order to generate a summary thereof, the digital text comprising a plurality of sentences;
        parse each of plurality of sentences into one or more concept phrases, each of the one or more concept phrases having at least one word by applying at least one parsing parameter;
        execute a first analysis to generate a context-independent relation (CIR) value for a given concept phrase of the one or more concept phrases, the CIR value representing a first ratio of a co-inclusion of: (i) at least one word of the given concept phrase and (ii) at least one word of each of the remaining concept phrases of the one or more concept phrases;
        execute a second analysis to generate a context-dependent relation (CDR) value for the given concept phrase, the CDR value representing a second ratio of: (i) a number of sentences where the given concept phrase co-occurs with another concept phrase of the one or more concept phrases to (ii) a total number of the plurality of sentences containing the other concept phrase within the digital text;
        determine a total CIR weight and a total CDR weight for each of the concept phrases;
        determine, for each of the concept phrase, a concept meaning value, based at least in part on its respective total CIR weight and the total CDR weight;
        determine, for a given sentence of the plurality of sentences, a sentence meaning value, based at least in part of the concept meaning value of each concept phrase contained in the given sentence;
        rank each sentence based at least on the determined sentence meaning value; and
        generate the summary of the digital text, the summary of the digital text comprising at least one sentence extracted from the digital text based on its determined ranking.

* * * * *